(12) United States Patent
Frank

(10) Patent No.: US 9,303,691 B2
(45) Date of Patent: Apr. 5, 2016

(54) ROLLING BEARING ARRANGEMENT WITH INCLINED HARDNESS ZONES

(71) Applicant: IMO Holding GmbH, Gremsdorf (DE)

(72) Inventor: Hubertus Frank, Höchstadt (DE)

(73) Assignee: IMO Holding GmbH, Gremsdorf (DE)

( * ) Notice: Subject to any disclaimer, the term of this patent is extended or adjusted under 35 U.S.C. 154(b) by 0 days.

(21) Appl. No.: 14/367,506

(22) PCT Filed: Dec. 21, 2012

(86) PCT No.: PCT/IB2012/002782
§ 371 (c)(1),
(2) Date: Jun. 20, 2014

(87) PCT Pub. No.: WO2013/093609
PCT Pub. Date: Jun. 27, 2013

(65) Prior Publication Data
US 2014/0348456 A1    Nov. 27, 2014

(30) Foreign Application Priority Data

Dec. 22, 2011  (EP) .................................... 11010143

(51) Int. Cl.
*F16C 33/58*  (2006.01)
*F16C 19/49*  (2006.01)
*C21D 9/40*   (2006.01)
(Continued)

(52) U.S. Cl.
CPC ............... *F16C 33/585* (2013.01); *C21D 1/42* (2013.01); *C21D 9/40* (2013.01); *F16C 19/49* (2013.01); *F16C 33/64* (2013.01); *C21D 2221/02* (2013.01); *C21D 2221/10* (2013.01); *F16C 2202/04* (2013.01); *F16C 2300/14* (2013.01); *Y02P 10/253* (2015.11)

(58) Field of Classification Search
CPC .... F16C 19/49; F16C 33/585; F16C 2223/10; F16C 2223/18; F16C 2202/04; F16C 33/64; F16C 2300/14; C21D 9/40; C21D 2221/00; C21D 1/42; C21D 2221/02; C21D 2221/10; Y02P 10/253
See application file for complete search history.

(56) References Cited

U.S. PATENT DOCUMENTS 5,861,067 A * 1/1999 Hetzner ........................ 148/326
7,824,106 B2 * 11/2010 Hirai et al. .................... 384/544
(Continued)

FOREIGN PATENT DOCUMENTS

DE   10 2005 006 701    3/2006
DE   10 2007 014 637    10/2007
(Continued)

*Primary Examiner* — Alan B Waits
(74) *Attorney, Agent, or Firm* — Pandiscio & Pandiscio

(57) ABSTRACT

The invention relates to a rolling bearing arrangement for a rotational connection for a roller/ball combination raceway system, for the purpose of relative movement of a plurality of rotating elements, in particular two rolling bearing rings supported on one another. At least one rolling element raceway is hardened along its annular shape in the contact area between rolling element and rolling bearing ring. The invention is characterized in that provided at the beginning and the end of the at least one hardened rolling element raceway is at least one overlap region which extends along the rolling element raceway, the overlap region comprising a region of lower hardness than the surrounding hardened region, the lower hardness gap region, extending at an inclination through the overlap region.

15 Claims, 6 Drawing Sheets

(51) Int. Cl.
*F16C 33/64* (2006.01)
*C21D 1/42* (2006.01)

(56) References Cited

U.S. PATENT DOCUMENTS

| | | | | |
|---|---|---|---|---|
| 8,535,457 | B2 * | 9/2013 | Maeda | 148/319 |
| 8,714,829 | B2 * | 5/2014 | Hirai | 384/544 |
| 8,714,831 | B2 * | 5/2014 | Mori | 384/558 |
| 8,770,842 | B2 * | 7/2014 | Nomura et al. | 384/42 |
| 8,793,878 | B2 * | 8/2014 | Gegner et al. | 29/898.066 |
| 8,844,489 | B2 * | 9/2014 | Fujita et al. | 123/90.51 |
| 2014/0367376 | A1 * | 12/2014 | Burtchen et al. | 219/665 |

FOREIGN PATENT DOCUMENTS

| | | |
|---|---|---|
| EP | 1 988 179 | 11/2008 |
| JP | 11 243726 | 9/1999 |
| JP | 2002 174251 | 6/2002 |
| WO | WO 2010/007635 | 1/2010 |

* cited by examiner

ROLLING BEARING ARRANGEMENT WITH INCLINED HARDNESS ZONES

BACKGROUND OF THE INVENTION

1. Field of the Invention

The invention relates to a rolling bearing arrangement for a rotational connection for the purpose of relative movement of a plurality of at least two rotating elements supported against each other; in particular, rolling bearing rings supported against each other, at least one rolling element raceway being hardened along its annular shape in a contact area between rolling element and rolling bearing ring.

2. Description of the Prior Art

In the prior art, raceway hardening is often envisaged for rolling bearing rings in order to increase the load capacity, and thus the service life, of a rolling bearing arrangement for a rotational connection. One technique known is the use of continuous annealing furnaces, in which the workpieces to be hardened, for example, rolling bearing rings, pass through an apparatus in the longitudinal direction and are thereby heated such that only certain subregions of the particular rolling bearing ring are hardened. One of the most commonly used methods of raceway hardening is inductive hardening. In this process, inductors, or induction heads, are moved relative to a ring to be hardened, a raceway to be hardened, or a portion of the rolling bearing ring.

Patent document DE 10 2007 014 637 A1 discloses such an apparatus for the inductive heating of at least surface layers of an annular workpiece. The inductors, or induction heads, are movable, at least with respect to their radial distances from one another.

WO 2010/007635 A1 and EP 1 988 179 A2 also describe methods and devices by means of which subregions of raceways of rolling element rings can be inductively hardened. These inventions employ at least two inductors, or induction heads, which are brought to a preset distance from the surface to be hardened, while a workpiece to be hardened and the inductors move relative to one another. Finally, DE 10 2005 006 701 B3 further discloses a method for producing a bearing ring for large rolling bearings that operates on a basically similar principle.

A so-called "hardness gap" can also be an important factor in the practical installation of such rotational connections. "Hardness gap" is the term for the discontinuity between the beginning and the end of the raceway hardening. In practice, this is the location that undergoes little or no hardening during the process of hardening the raceway, particularly during the inductive hardening process. In the current state of this technology, almost all rolling bearing arrangements have such a hardness gap region.

JP 2002 174 251 A shows, in principle, and by way of example, a specially dimensioned such region surrounding the hardness gap, depicted as a window-like section extending along a rolling element raceway disposed between two adjacent hardened regions.

This location is usually of lower hardness than the surrounding hardened material. Less-hard regions of the raceway usually present disadvantages for the rolling behavior of the rolling elements, since the load capacity in less-hard sections of the raceway is lower than in the hardened raceway sections.

In addition, many rolling bearing arrangements, for example, ball rotational connections, particularly four-point bearings, have bores through which the raceway system can be filled with rolling elements, particularly ball rolling elements. The bores are provided with and sealed by suitably fitted fill plugs that match the diameter of the bores. Thus, the region of the filling bore and of the associated fill plug also constitutes a weak point in the raceway system, since the load capacity of the raceway section is lower in this region than in the hardened sections of the raceway.

JP 11 248 726 A discloses such a region of a filling bore, which normally is not hardened, as a result of which the load capacity in that region of the raceway is lower than in the hardened raceway sections.

If induction hardening were also performed in the region of the filling bore, this would cause significant geometric "distortion" due to the effect of the heat and the ensuing structural change. The dedicated and precision-fitted fill plugs might then be difficult, or impossible, to insert properly into the hole of the filling bore. For this reason, usually no hardening whatsoever is done in the region of the filling bore(s).

In practice, an attempt is made to palliate both of the above disadvantages by placing the locations of the hardness gap and the bores for feeding the rolling elements into and removing them from the raceway system close together, so that there is only one location in the raceway system where the load capacity is low, instead of two such locations. In practice with regard to ball rotational connections, for example in the case of four-point bearings, the location of the hardness gap is thus also characterized by the fill plug for a bore through which the rolling elements are pushed as they are fed into and removed from the raceway system. This bore usually has a slightly larger cross section than the rolling elements of the raceway system itself. In some rolling bearing arrangements, for example in roller rotational connections, no such filling bores are needed.

In practice and according to the prior art, this region of the hardness gap follows an imaginary line that extends in a radial plane emanating from the axis of rotation of the rotational connection. The region of the hardness gap therefore marks the beginning and the end of the hardened region of a rolling bearing ring.

In all the currently used systems for preferably inductively heating subregions of an annular workpiece, and also in all the abovementioned systems for the, in particular, inductive heating of the rolling element raceways of a rolling bearing ring, the at least one inductor, or induction head, is disposed perpendicular to the rolling element raceway to be hardened, thus resulting in a hardness gap region that extends almost exactly radially to the raceway at the beginning and at the end of each inductively hardened zone. The hardness gap region, like the hardened region, forms so as to be offset parallel to the plane through which the inductor, or induction head, passes circularly during the hardening process. Consequently, the hardness gap region and the hardened zone always form on the same workpiece surface/rolling element raceway.

The width b of such a preferably elongated hardness gap region can be between one and more than fifteen millimeters, or in exceptional cases, even much more, sometimes up to 100 or 200 millimeters, and is dependent on the size of the rolling elements, the machine settings, and the operator's handling of the inductive hardening device, or inductive hardening machine. Some inductive hardening machines are equipped with incremental angle encoders, which cause the hardening to begin at, for example, 0°, and end at, for example, 359°, so that the circular segment covered by the inductor or induction head never amounts to a full 360°. It is customary to try to keep this hardness gap region as small as possible, since it represents a region of lower hardness and thus of lower load capacity, and usually is, or has to be, relief-ground. This relief-grinding involves an additional process, thus entailing more expenditure.

One disadvantage of the conventional systems used heretofore for inductive hardening of rolling element rings is that the aforesaid hardness gap region extending almost exactly radially to the raceway behaves negatively in practice, especially as the—usually hardened—rolling elements roll over this hardness gap region. Consequently, rolling bearing rings hardened according to conventional inductive hardening systems are also disadvantageous in the hardness gap region, in comparison to the hardened regions.

In the first place, the load capacity of a rolling bearing ring that has been inductively hardened in a conventional manner is reduced in the region of the hardness gap, compared to the rest of the hardened raceway; second, this hardness gap region is located in a radially outwardly extending plane emanating from the main axis of rotation, so the running behavior of the rolling elements undergoes an abrupt change whenever they roll over the particular location in the rotational connection where the hardness gap is located; and in the third place, this increases the running noise of the rolling bearing arrangement, or rotational connection, as a whole.

From a consideration of these disadvantages comes the problem initiating the invention, that of creating an improved rolling bearing arrangement that exhibits improved running behavior with a simultaneous increase in load capacity in the beginning and end regions of the raceway hardening(s), which hardening(s) is/are limited in the circumferential direction, accompanied at the same time by reduction of the running noise of the rotational connection, or rolling bearing arrangement, in particular as the rolling elements roll over the beginning and ending region of the raceway hardening(s), and particularly as they roll over the respective hardness gap region.

SUMMARY OF THE INVENTION

Described herein is an inventive rolling bearing arrangement for a rotational connection, with ball, roller, cylindrical roller, barrel roller, tapered roller or cross roller shaped rolling elements, for example, a ball rolling element raceway system, but preferably, in particular, a roller/ball combination raceway system, in which a plurality of rotating elements supported on, or against, one another can be moved relative to and concentrically with one another. This applies, for example, to two rolling bearing rings mounted on or against each other, but also, for example, to a plurality of annular segments, or segmented rings, supported on one another. The rolling bearing arrangement according to the invention is always configured to include at least one rolling bearing raceway that is hardened along its annular shape in the contact area between the rolling elements and the rolling bearing ring, in particular hardened by an induction or inductive hardening method.

The inductive hardening takes place according to the invention by intense heating of the workpiece to be hardened, which is usually in the form of a body made of heat-treatable or rolling bearing steel, to above 600° C., preferably to above 800° C. The structure of the material/steel is then altered by quenching the material in a suitable quenching medium, which is usually a liquid emulsion, for instance in the form of a preparation composed of polyglycols, additives and water. It becomes both more finely crystalline and harder. Examples of hardenable main steel materials used for rolling bearings are 25CrMo4 or 42rCrMo4, or C45N, as well as semi-stainless steels, for example X20Cr13.

The inventive raceway system to be hardened can contain various rolling elements, depending on the particular form and function. Rolling elements that can be used in the arrangement according to the invention include, in principle, ball, roller, cylindrical roller, barrel or tapered rolling elements, or cross-arranged roller-shaped or even pendulum-type rolling elements. The raceway system can also be implemented as a combination bearing or combination system, for example as a roller/ball combination connection.

The hardening method for the raceway is advantageously designed so that the degree of hardness of the hardened raceway is approximately the same as the degree of hardness of the rolling elements used, or slightly lower, for example, roughly in the range between 48 HRC and 65 HRC.

This improved rolling bearing arrangement according to the invention is therefore to be understood as a rotational connection for the relative movement of at least two rotating elements supported on, or against, one another, particularly two rolling bearing rings supported on, or against, each other, wherein at least one rolling element raceway is hardened along its annular shape in the contact area between rolling element and rolling bearing ring, in particular hardened by an induction or inductive hardening method.

According to the invention, at the beginning and at the end of the at least one hardened rolling element raceway there is at least one overlap region that extends along the rolling element raceway, the overlap region comprising a region of lower hardness, the region referred to hereinabove as the hardness gap, which extends through the overlap region at a given angle $0°<\epsilon<90°$ to the raceway normals. The term "raceway normals" is to be understood here as the imaginary line extending radially outward from the axis of rotation of the rolling bearing arrangement, ergo radially annularly from the axis of rotation of the rotational connection. An elongated hardness gap region has proven particularly advantageous in the context of the invention, the longitudinal axis of the region, or the tangent to its longitudinal extent, forming an angle $\epsilon$ with the raceway normals that is larger than 5° and smaller than 85°. An angle $\epsilon$ with the raceway normals of approximately 45° has proven advantageously relevant to practice and lends itself well to production.

Expressed in another way, an elongated hardness gap region, i.e., an elongated region of reduced hardness, is to be arranged such that its longitudinal axis, or the tangent to its longitudinal extent, forms a given angle $\epsilon$ with a radial plane emanating from the axis of rotation of the rolling bearing arrangement and extending radially outward therefrom to the hardness gap region, with $0°<\epsilon<90°$, preferably $5°<\epsilon<85°$, particularly $30°<\epsilon<60°$. Particular advantages are afforded by an angle $\epsilon$ of approximately 45°.

The raceway system is equally well suited for receiving cages, or spacers, and for a system that includes no spacing components, for example, a full-complement roller or ball type rotational connection.

In a further embodiment of the invention, the inclined path of the hardness gap region need not be exactly linear, but can follow a freeform shape, or a curved shape, or an arc-like shape, or even a combination of freeform and/or curved and/or arced, where appropriate, including straight segments therein. In any case, however, the path will extend essentially obliquely, or slantingly, across the overlap region, i.e., a line connecting the two far ends of the elongated region forms the aforesaid angle, further specified above with the radial plane emanating from the axis of rotation.

In a further, more elaborated embodiment of the invention, the overlap region can be located near at least one fill plug bore sunk into the rotating element, or can be congruent with this fill plug bore, or at least can overlie or pass through this region of the fill plug bore.

If a plurality of raceways are hardened, then a plurality of overlap regions and hardness gap regions are created—as a rule and preferably, one hardness region per hardened raceway. A respective overlap region, and/or hardness gap region, is always present between the beginning and end of the hardened region of each raceway.

According to a requirement of the invention, each overlap region comprises at least one region, the so-called hardness gap region, having a lower hardness than the respective immediately surrounding hardened raceway region, the region of lower hardness being wholly, or partially, processed so that an elongated or track-shaped, or ribbon-like relief-ground region, can also be produced as a result. Post-processing, for example, finish-grinding or relief grinding, has proven particularly advantageous.

The aforesaid relief-ground region can thus wholly or partially overlie, or overlap, the respective hardness gap region. According to the invention, at least one overlap region comprising a region of lower hardness can be realized in each raceway of the rolling bearing arrangement.

Due to the configuration of the raceway, it is a consequence according to the invention that the tapering-off zones, or tapering-off regions, of the hardened regions, particularly the tapering-off regions of the hardness zones, are inclined at a given angle to the normals to the raceway in the overlap region.

The aforesaid angles of inclination can, for example, be very pronounced and be between 0° and 90°, but can preferably have an angle of more than 5° and less than 85°, particularly an angle of between 30° and 0°, optimally an angle of approximately 45°.

To put it another way, the tapering-off zones, or tapering-off regions, of the hardened regions, particularly the tapering-off regions of the hardness zones, are preferably arranged such that their longitudinal axes, or the tangents to their longitudinal extents, together with a radial plane emanating from the axis of rotation of the rolling bearing arrangement and extending radially outward to the hardness gap region, form a given angle $\epsilon_1$, where $0°<\epsilon_1<90°$, preferably $5°<\epsilon_1<85°$, particularly $30°<\epsilon_1<60°$. Particular advantages are afforded by an angle $\epsilon_1$ of approximately 45°.

A further consequence according to the invention is that in the operation of the rotational connection, or rolling bearing arrangement, the rolling elements rolling over the relief-ground region at any given instant bear primarily against the hardened region(s) or hardness zone(s) and are supported in this way, thus relieving the load on the hardness gap region per se.

Such load relief is particularly marked if $$\tan \epsilon > b/l,$$

Wherein l is the length and b the width of the hardness gap region, and $\epsilon$ is the angle of the hardness gap region which the latter, or its longitudinal axis, or the tangent to its longitudinal axis, forms with a plane emanating from the axis of rotation of the bearing, or rotational connection, and extending radially outward to the hardness gap region.

In this case, it is ensured that rolling elements with a sufficient conforming region, particularly roller-shaped rolling elements, always encounter a load-bearing hardened region by which they are supported, particularly even when rolling across the hardness gap region. This condition is synonymous with the statement that the width b of the hardness gap region is smaller than the tangential slope $\tan \epsilon$ of the hardness gap region multiplied by its length l, that is, the offset between the two ends of the hardness gap region in the azimuthal direction. The more pronounced the above inequality, the better the results; that is, for example, if $\tan \epsilon > 2 \cdot b/l$ or, better, $\tan \epsilon > 3 \cdot b/l$ or even $\tan \epsilon > 4 \cdot b/l$.

In general, with respect to the invention, the hardness depth of the hardened region, or the hardness zone, can be less than 20 mm, preferably less than 10 mm.

With regard to the relief-ground region or the hardness gap region, it is recommended that the track-shaped or ribbon-like region of lower hardness be narrower than 200 mm, preferably narrower than 50 mm.

BRIEF DESCRIPTION OF THE DRAWINGS

Further features, characteristics, advantages, and effects of the invention will emerge from the following description of preferred embodiments of the invention and by reference to the accompanying drawings, wherein.

DESCRIPTION OF THE PREFERRED EMBODIMENTS

Figure 1:
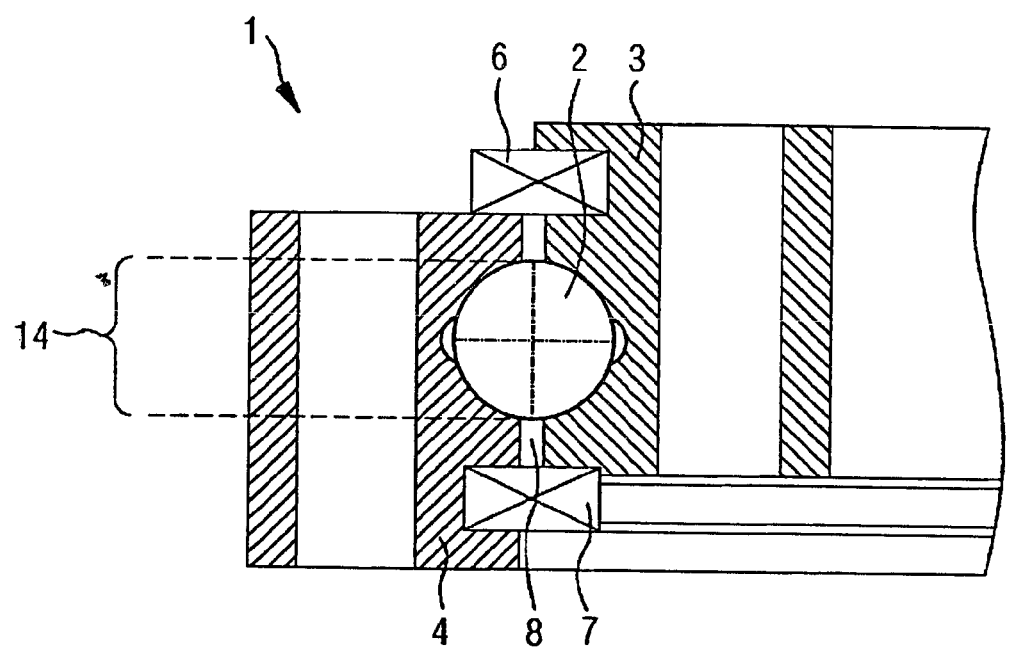
FIG. 1 is a schematic radial section through a rolling bearing raceway system of a ball bearing, or ball rotational connection, configured as a four-point bearing, with implied attaching facilities on both sides for attaching it to mating structures, implied sealing systems, and a fill plug bore indicated in broken lines.

FIG. 1 shows, by way of example, a schematic radial section of a rolling element raceway system 1 of a ball rotational connection, configured as a four-point bearing with implied attaching facilities on both sides for attaching it to mating structures and with seals 6; 7 above and below the raceway system for sealing a rolling element gap 8, as well as a graphically suggested fill plug bore 14. A rolling element raceway 16 for balls is filled and emptied via the bore 14, which is sealed by means of a fill plug. The fill plug prevents the egress of foreign bodies from, and their ingress into, the raceway system, in that the fill plug seals the raceway system. The fill plug bore 14 is provided with approximately a same diameter as rolling elements 2, but in practice is dimensioned as minimally larger. The rolling element raceway 16 is provided in both rotating elements 3; 4 in similar fashion.

Figure 2:
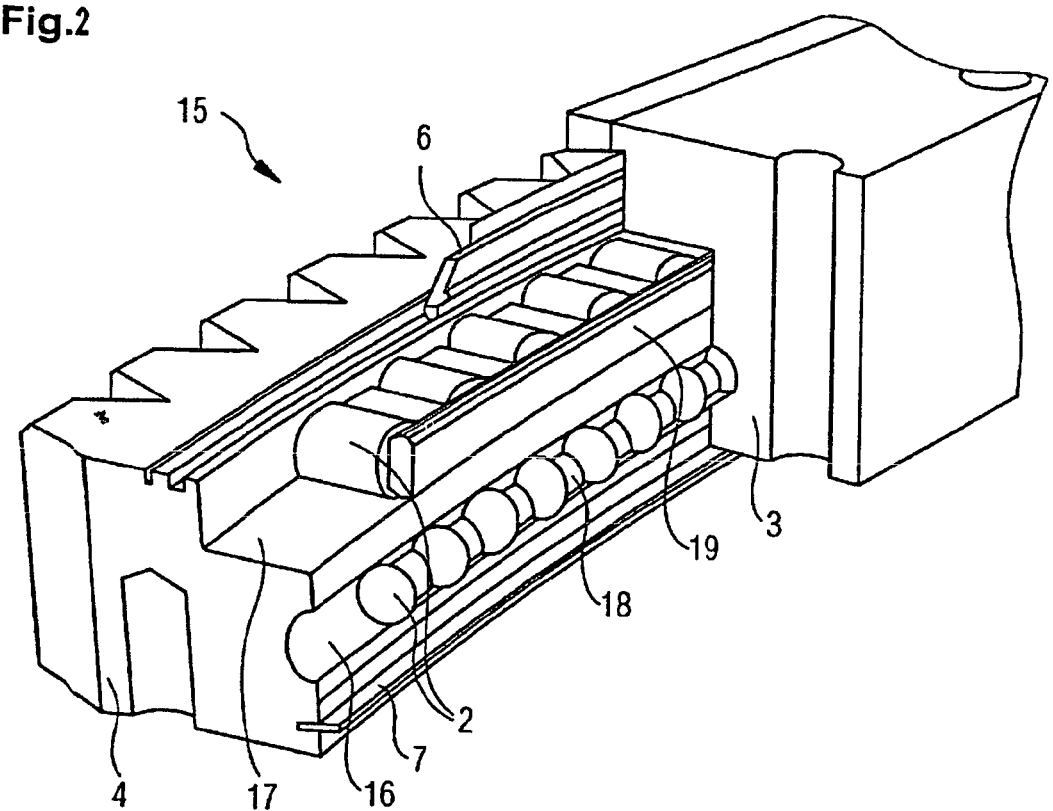
FIG. 2 is a perspective diagram of a broken-away rotational connection of a rolling bearing raceway system in the form of a combination roller and ball bearing with two raceways arranged axially, one above the other, the upper raceway system being a rotational connection using rollers guided in a cage, whereas the lower raceway system is a ball rotational connection with spacers.

FIG. 2 shows, by way of example, a perspective diagram of a rotational connection of a rolling element raceway system in a roller/ball 15 combination with two raceways 16; 17 arranged axially one above the other. The upper raceway system 17 denotes a roller rotational connection, preferably with roller-shaped rolling elements 2 guided in a cage 19. The lower raceway system denotes a ball rotational connection comprising spacers 18. Large portions of both raceways 16; 17 are inductively hardened. The rolling elements 2 are also hardened and roll over the raceways 16; 17. This is a rotational connection that is able to rotate an outer rolling bearing ring 4 against an inner rolling bearing ring 3.

Figure 3:
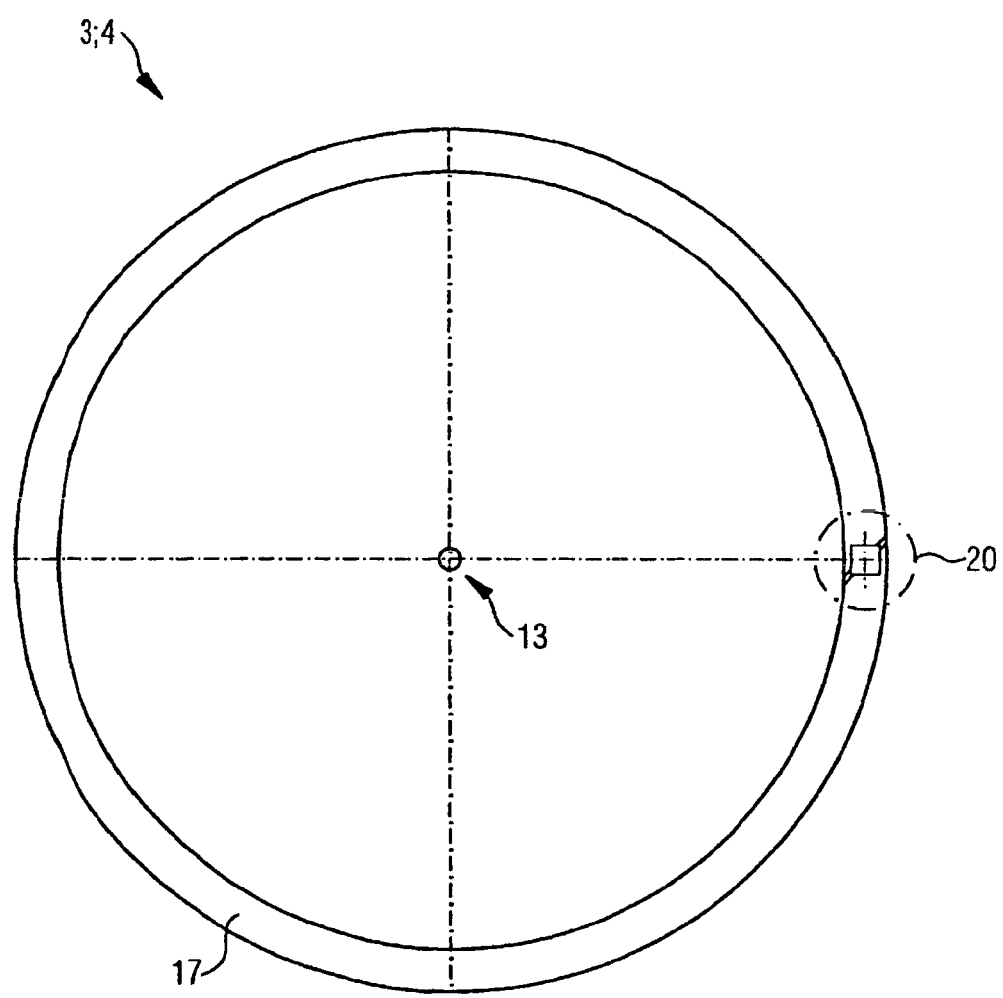
FIG. 3 is a plan view of a roller raceway, or rolling-element raceway, for rollers, which raceway is provided in the particular rolling bearing ring; for purposes of simplification, only the raceway is shown, the details of the rolling bearing arrangement being omitted.

FIG. 3 shows, by way of example, a plan view of the raceway system 15 comprising the raceway 17 for a roller 2; for purposes of simplification, only the hardened raceway 17 is illustrated. A detail 20 marks an overlap region 12, and additionally, the beginning and end region of the raceway hardening.

Figure 2A:
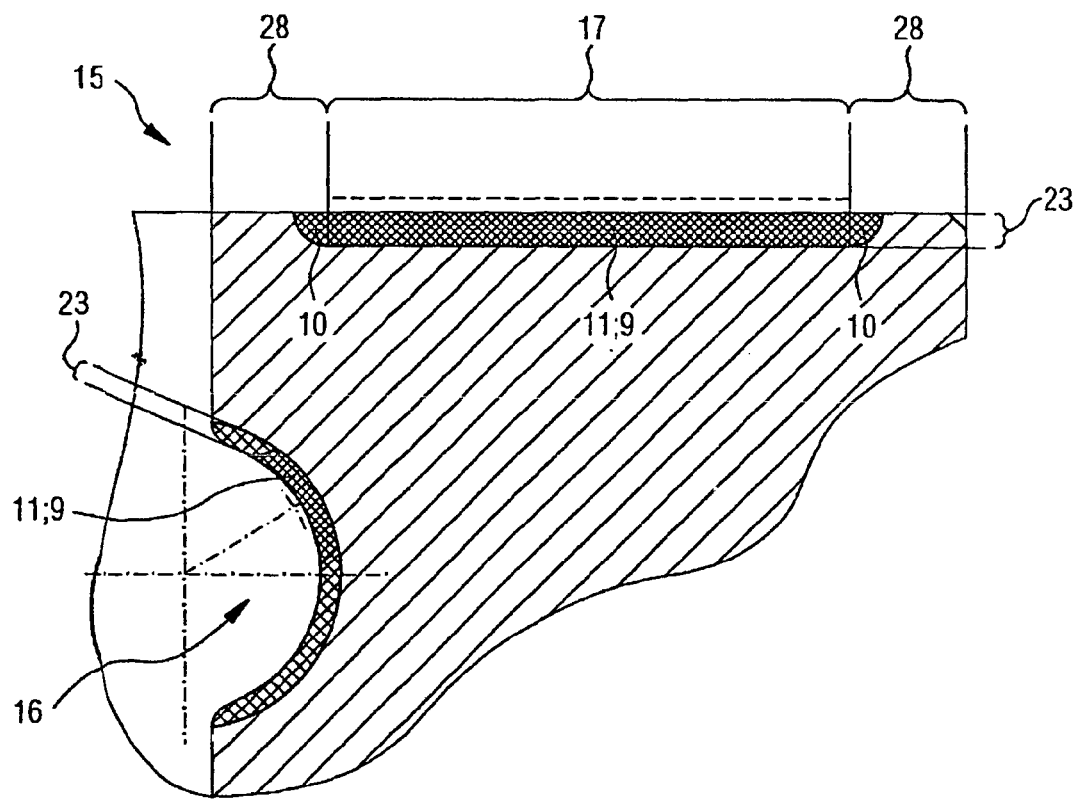
FIG. 2a is a partial section in the form of a schematic radial section through a rotational connection with a rolling bearing raceway system as a combined roller and ball bearing, with two raceways arranged approximately axially one above the other, approximately as a section through FIG. 2 would appear, except broken away; the hardened regions of the raceways are highlighted by cross-hatching.

FIG. 2a shows, by way of example, a partial section, or a detail as a schematic radial section, of the rotational connection of a rolling element raceway system 15 in the form of a roller and ball combination comprising two raceways arranged approximately axially one above the other. In particular, shaded areas indicate hardened regions on the raceways. Particularly indicated are hardened regions 9; 11 on the raceways 16; 17. The hardened regions extend into the material of the rolling bearing ring to a given hardness depth 23. The result, according to the invention, is an inclinedly extending region 22 of lower hardness, bounded by tapering-off regions 10 of the hardened regions from the region of lower hardness 22. As a rule, in the case of a raceway 17 for roller-shaped rolling elements 2, the hardened region does not extend all the way to the end of the planed surface, but instead is spaced apart therefrom, and thus runs to the edge at a distance 28 from the hardened region 9; 11.

Figure 3A:
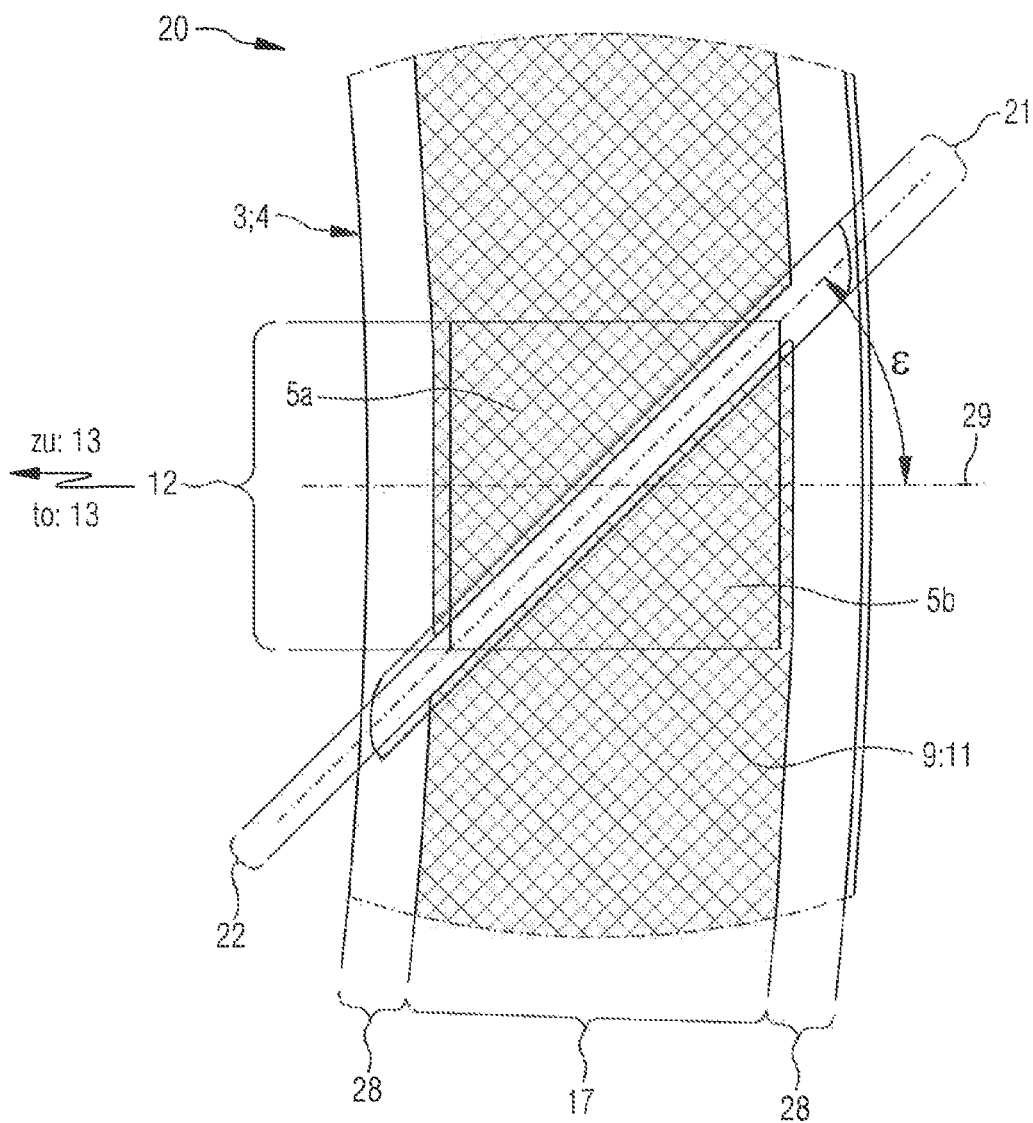
FIG. 3a is an enlarged representation of detail 20 in FIG. 3 that includes the inductively hardened region, and the overlap region, and the beginning and end of the raceway hardening; also depicted is a ribbon- or track-shaped hardness gap region having an inclination at an angle $\epsilon$.

FIG. 3a discloses an exemplary detail 20 of a plan view of the roller raceway 17, i.e., of the rolling element raceway for the rollers, comprising the inductively hardened region 9; 11 and the overlap region 12. The raceway 17 is realized in the respective rolling bearing ring 3; 4. The hardened region is located in the center of the raceway, and thus is spaced apart from the edge thereof by the distance 28. The hardened region 9, 11 of the raceway 17 is indicated by cross-hatching. The overlap region 12 defines the beginning and the end of the hardened region of the rolling element raceway 17, measured along said rolling element raceway 17.

Standing out against the region marked by cross-hatching is the non-cross-hatched region 22 of lower hardness, representing a hardness gap region 22. The hardness gap region 22 extends through the overlap region 12 at a given angle $\epsilon$ to raceway normals 29. The raceway normal 29 is the imaginary line extending radially from the center of the circle represented by the rolling bearing arrangement, i.e., radially annularly from a rotation axis 13 of the rotational connection. This angle $\epsilon$ is between 0° and 90°; it is preferably larger than 5° and smaller than 85°, particularly approximately 45°. The region of lower hardness 22 extends, for example, in a track shape or a ribbon-like manner through the overlap region 12.

By this hardness gap region 22 of lower hardness, the overlap region 12 is divided into a first part 5a of the overlap region 12 and a second part 5b of the overlap region 12. In FIG. 3a, the actual path of said hardness gap region 22 of lower hardness, includes a straight section.

FIG. 3a discloses, by way of further example, that the hardness gap region 22 is wholly, or partially, finish-ground or relief-ground in the overlap region 12, but also beyond it on one or both sides, resulting in a track-shaped or ribbon-like relief-ground region 21; the relief-ground region 21 and the hardness gap region 22 wholly, or partially, overlie or overlap, each other. As a rule, the track-shaped or ribbon-like region of lower hardness 22 is narrower than 25 mm.

Figure 4:
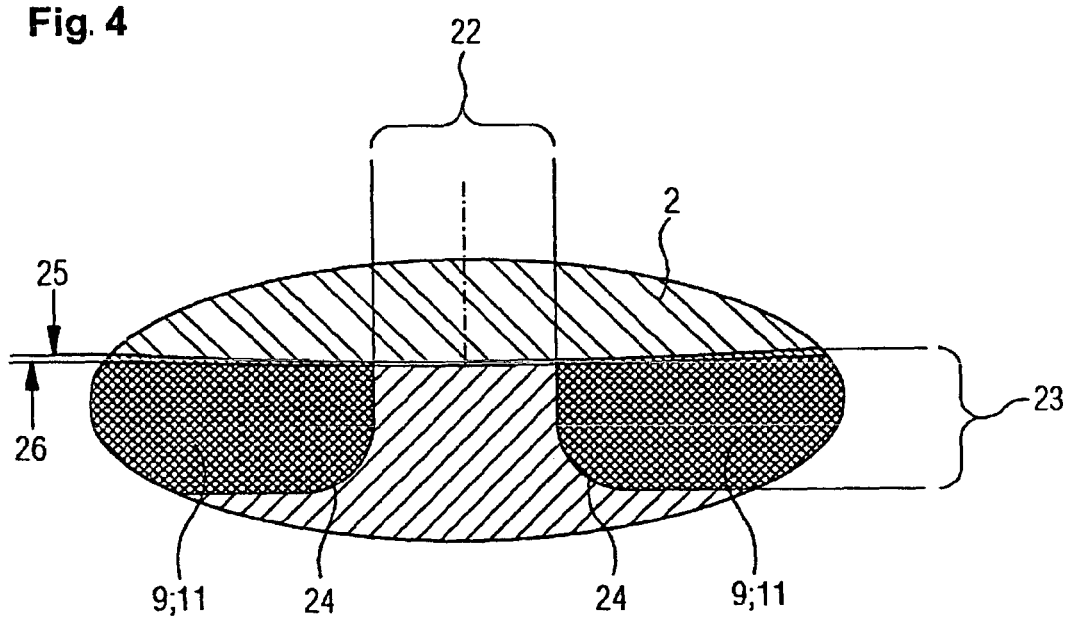
FIG. 4 is a partially broken-away section through FIG. 3a along line 29, revealing, in a schematic, enlarged view, a possible cross-sectional shape of the hardness zone and of the hardness gap within the overlap region in the contact area between the rolling elements and the raceway.

FIG. 4 discloses, schematically and by way of example, a schematic view or a detail, greatly enlarged, of a possible path 24 of the hardness zone and the hardness gap 22 in the contact area between rolling element 2 and raceway 17. The hardness depth 23 and a contact area 25; 26 between the rolling element 2 and the rolling element raceway 17 are shown. As a rule, the hardness depth 23 of the hardened region 9, or the hardness region 11, is less than 20 mm.

The invention claimed is:

1. A rolling bearing arrangement for a rotational connection, with rolling elements, for the purpose of relative movement of two rolling bearing rings in contact with each other, with at least one rolling element raceway of annular shape which is hardened in a hardened region along a contact area between the rolling elements and the respective rolling bearing ring, wherein provided at a beginning and/or at an end of the at least one hardened rolling element raceway is at least one overlap region extending along said rolling element raceway, said overlap region comprising a hardness gap region of lower hardness than a surrounding hardened region, which extends at an inclination relative to raceway normals through the overlap region.

2. The rolling bearing arrangement for said rotational connection in accordance with claim 1, wherein the beginning and the end of the hardened region of the raceway selectively coincide with, or overlie, or overlap, each other along the raceway normals.

3. The rolling bearing arrangement for said rotational connection as in claim 1, wherein the hardness gap region of lower hardness extends so as to be inclined at a given angle ($\epsilon$) to the raceway normals between 0° and 90°, or at an angle ($\epsilon$) to the raceway normals of more than 5° and less than 85°.

4. The rolling bearing arrangement for said rotational connection in accordance with claim 1, wherein the hardness gap region of lower hardness extends in a direction of an imaginary line between a first part of the overlap region, and a second part of the overlap region wherein the actual path of said hardness gap region of lower hardness follows, at least in part, a selected one of a freeform shape, and a curved shape, and an arc shape.

5. The rolling bearing arrangement for said rotational connection as in claim 4, wherein the actual path of said hardness gap region of lower hardness includes at least one straight section.

6. The rolling bearing arrangement for said rotational connection as in claim 5, wherein the hardness gap region of lower hardness extends through the overlap region as a track-shaped or ribbon-like region.

7. The rolling bearing arrangement for said rotational connection as in claim 1, wherein the at least one hardness gap region of lower hardness than the immediately surrounding region is at least partially reworked in a way that removes material, such that a track-shaped, or ribbon-like relief-ground region, is provided.

8. The rolling bearing arrangement for said rotational connection as in claim 7 wherein the relief-ground region and the hardness gap region of lower hardness or are selectively adjacent each other or wholly or partially overlie or overlap each other along raceway normals.

9. The rolling bearing arrangement for said rotational connection as in claim 1, wherein at least one overlap region comprising a hardness gap region of lower hardness is provided in each raceway of the rolling bearing arrangement.

10. The rolling bearing arrangement for said rotational connection as in claim 2, wherein tapering-off regions of the hardened region, are, in the overlap region, inclined to the raceway normals at an angle of more than 5° and less than 85°.

11. The rolling bearing arrangement for said rotational connection as in claim 7, wherein the rolling elements rolling over the relief-ground region bear against the hardened region and are supported thereby.

12. The rolling bearing arrangement for said rotational connection as in claim 1, wherein hardness depth of the hardened region is less than 20 mm.

13. The rolling bearing arrangement for said rotational connection as in claim 6, wherein the track-shaped or ribbon-like region of lower hardness is narrower than 200 mm.

14. The rolling bearing arrangement for said rotational connection as in claim 1, wherein at least one rolling bearing ring comprises a heat-treatable steel or rolling bearing steel material, or a selected one of 25CrMo4, 42rCrMo4, C45N, and a semi-stainless steel material.

15. The rolling bearing arrangement for said rotational connection as in claim 1, wherein the hardened regions exhibit a Rockwell hardness between 48 HRC and 65 HRC, and regions of lower hardness exhibit a Rockwell hardness of less than 48 HRC, or of less than the core hardness of the base material.

* * * * *